June 24, 1930. B. TOMS 1,768,171
HAY LOADER
Filed Oct. 25, 1926 3 Sheets-Sheet 2
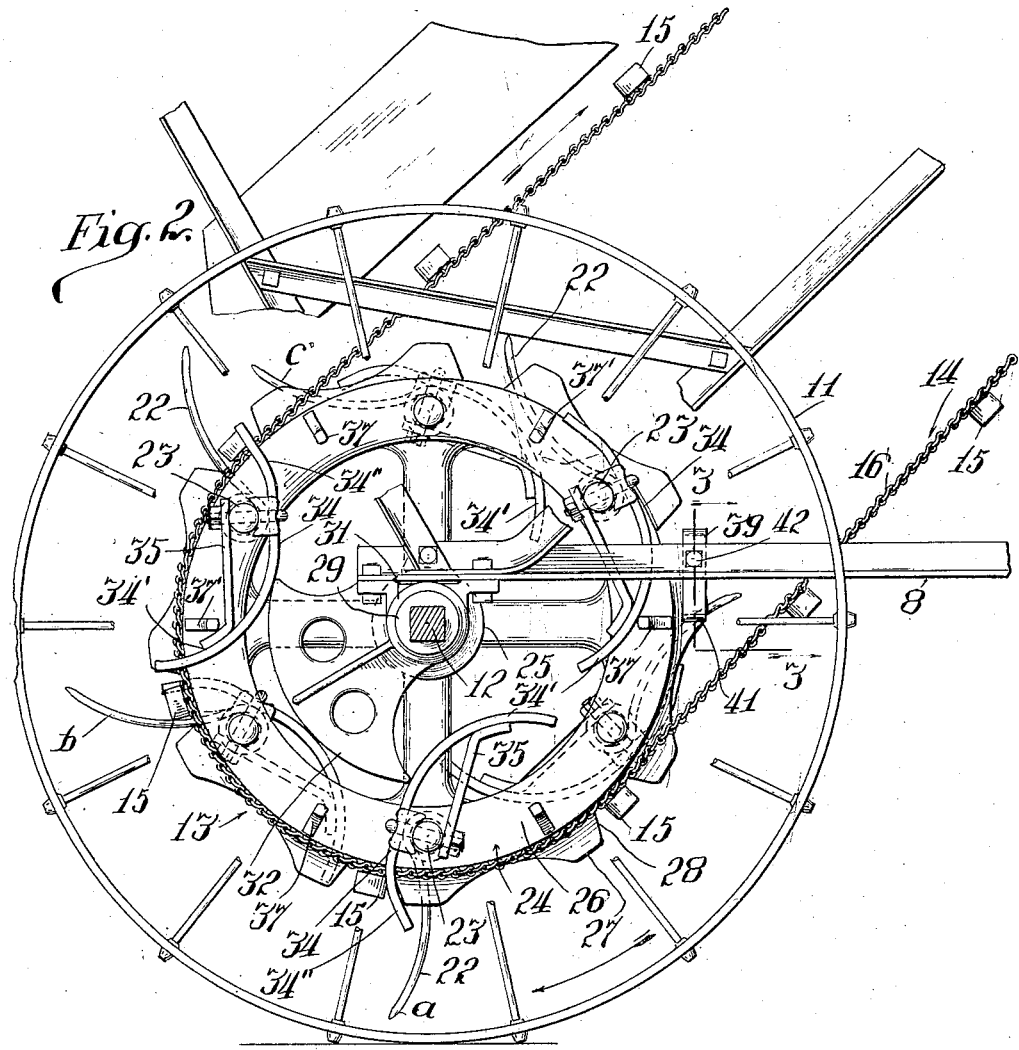
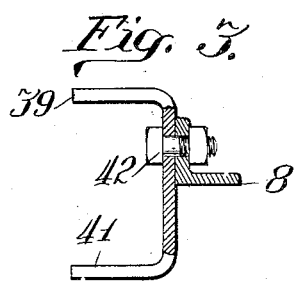

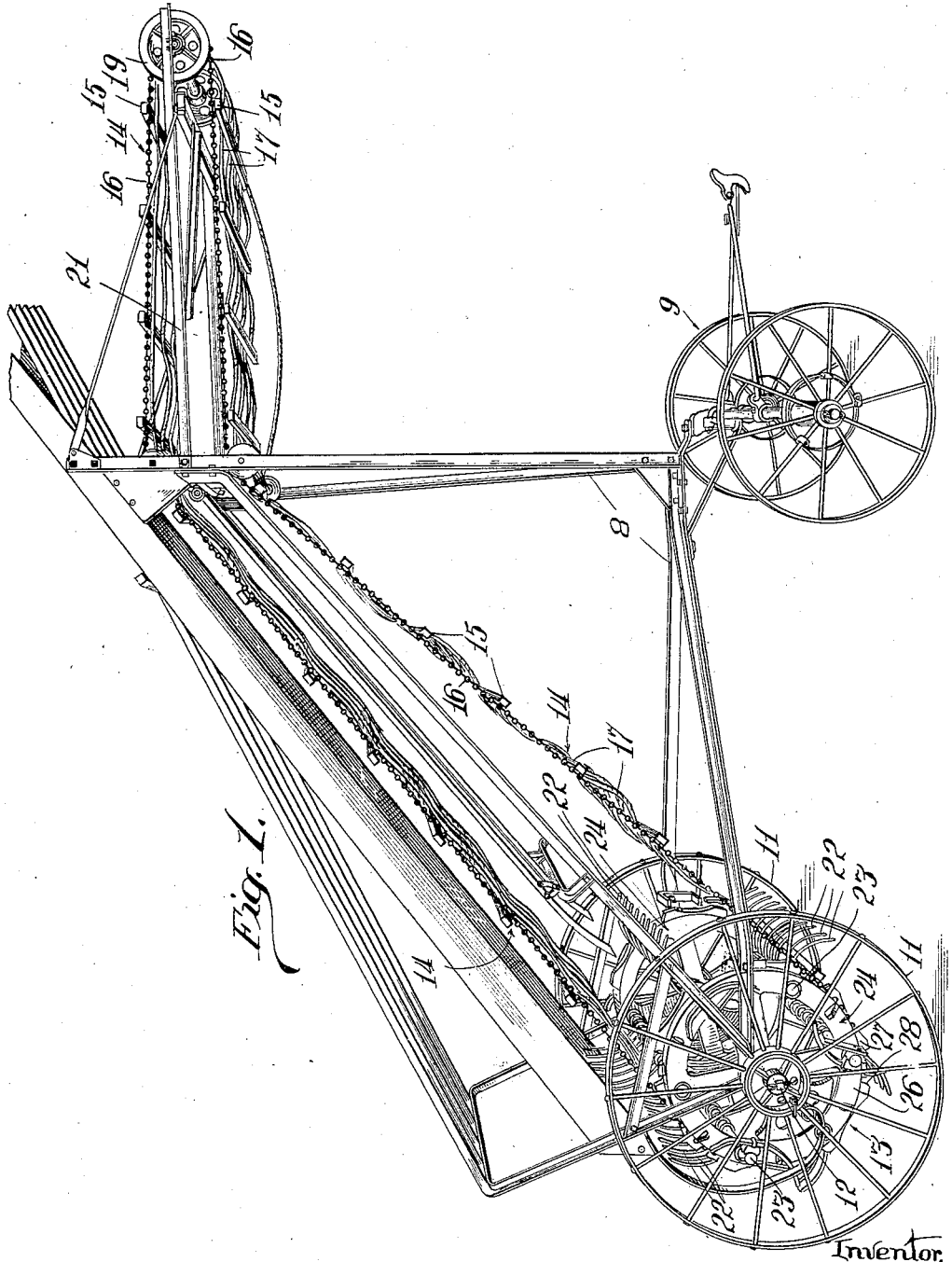

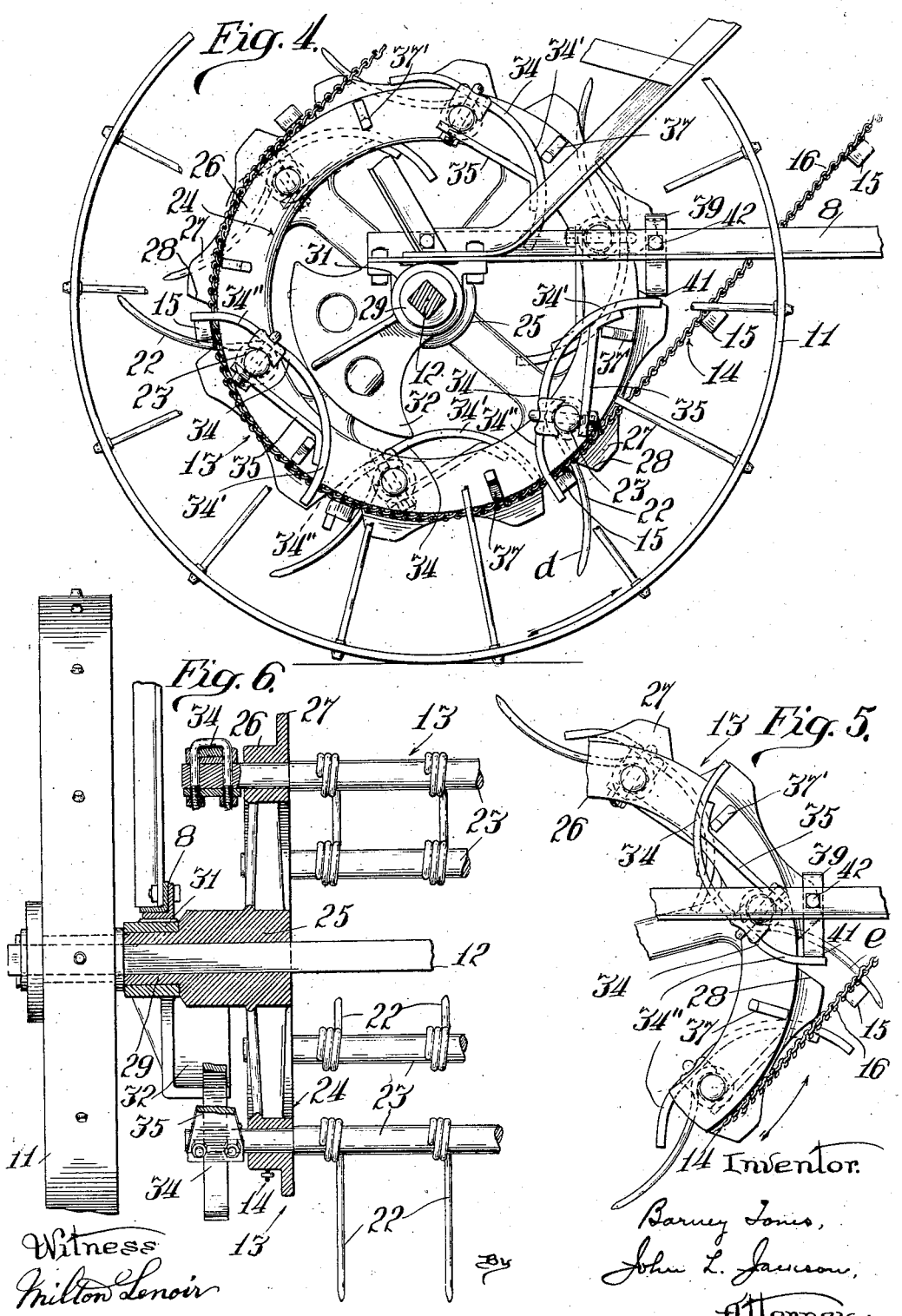

Patented June 24, 1930

1,768,171

UNITED STATES PATENT OFFICE

BARNEY TOMS, OF OTTUMWA, IOWA, ASSIGNOR TO DAIN MANUFACTURING COMPANY OF IOWA, OF OTTUMWA, IOWA, A CORPORATION OF IOWA

HAY LOADER

Application filed October 25, 1926. Serial No. 143,827.

The present invention relates to hay loaders, such as are adapted to be hitched to the rear end of a hay rack for loading hay thereon, and pertains specifically to the single cylinder type of loader comprising a frame, a pair of main drive wheels at the rear end thereof, a cylinder supported between said wheels and rotating therewith, an upwardly extending traveling carrier passing around said cylinder and serving to convey the hay up on to the hay rack, and transversely extending rows of teeth pivotally supported at different points about the periphery of the cylinder and adapted to swing down and grasp the hay for raising and placing the same on the carrier.

The primary feature of the invention pertains to improved means for preventing breakage of the carrier or any of the sets of teeth in the event of any backward travel of the cylinder or carrier, such as would follow from the backing of the hay rack with the loader hitched thereto, or in any separate manœuvring of the loader. In the normal forward travel of the loader, the different rows of teeth swing down into hay engaging position in a certain timed sequence so that successive rows of teeth will pass into successive "openings" in the carrier, such openings being defined between cross slats supported by the carrier. If this proper registry between the teeth and the openings in the carrier is not maintained, breakage of the carrier slats or of the teeth will be almost sure to follow. The means which assures proper registry between the teeth and the carrier openings during forward travel of the loader is not effective on the backward travel of the same, and if any row of teeth that has been projected through the carrier is allowed to swing back out of the path of the carrier, incident to such backward movement of the machine, there is no assurance that such row of teeth will again enter the path of the carrier properly positioned with respect to the openings, or spaces between slats, and hence breakage is likely to result.

The primary object of the present invention is to avoid this difficulty by providing stop means which will prevent any row of teeth that has been projected into or through a space or opening in the carrier from being withdrawn therefrom on reverse movement of the cylinder. While this stop means may permit a limited degree of backward movement of the loader, it should be so designed that if the backward movement is continued to the point where a row of teeth that has already swung down through its opening in the carrier is approaching a position where it will be withdrawn from such opening, the cylinder and carrier of the machine will be positively stopped against such continued backward motion.

Referring to the accompanying drawings illustrating a preferred embodiment of my invention:

Figure 1 is a perspective view of a single cylinder hay loader of the general type to which my invention has application.

Fig. 2 is a side elevational view of the cylinder portion of the loader, partly in section, showing the sets of hay gathering teeth in the different positions they assume in the normal forward rotation of the cylinder.

Fig. 3 is a detail sectional view of one of the stops which predetermines registry between the rows of teeth and the carrier openings, and which prevents reverse rotation of the cylinder as aforesaid, such view corresponding to a section on the line 3—3 of Fig. 2.

Fig. 4 is a view similar to Fig. 2, illustrating one of the shoes of the tooth bars in the position of engaging the reverse rotation stop, illustrated in Fig. 3.

Fig. 5 is a similar fragmentary view illustrating the action of this stop when engaging the short arm of the shoe, and Fig. 6 is a vertical sectional view through one end of the cylinder.

The general construction of the single cylinder type of hay loader is well known, and accordingly I shall only describe in detail such parts thereof as have particular relation to the present invention. Generally this type of machine comprises any suitable frame 8 supported at its front end by a forecarriage 9 having steerable wheels, and at its rear end by two main drive wheels 11. Supported on a live axle 12 extending between these wheels is a cylinder 13 over which travels an endless moving carrier 14. This carrier ordinarily consists of a series of spaced carrier slate 15 connected at their ends by endless chains 16 and having spaced ropes or other flexible members 17 connected to successive slats and defining the conveying surface of the carrier. The spaces between successive carrier slats 15 are the "openings" to which previous reference has been made, and through which carrier openings the gathering teeth on the cylinder 13 are adapted to pass. The carrier 14 extends upwardly from the cylinder 13 and thence passes forwardly over sheaves 19 on an adjustable frame portion 21. The hay conveyed by the upper flight or course of the conveyor is discharged from this forward end down on to the hay rack.

Referring to Figs. 2 and 4, the hay is picked up and placed on the upper flight of the carrier by transversely extending rows of teeth 22 mounted on tooth supporting bars 23 which are carried by the cylinder and have pivotal mounting in the end heads thereof. These end heads 24 are each constructed in the form of a wheel having a central hub 25, from which radiate spokes carrying a rim portion 26. The chains 16 of the conveyor track on the peripheries of these rim portions 26, and flanges 27 extending from such rim portions, and having notches 28 formed therein, receive the slats 15 of the carrier for driving the latter. The hub portion 25 of each end head has a reduced journal portion 29 which has bearing support in a bearing 31 bolted to the frame 8 of the machine. Formed integral with each end bearing, or suitably attached thereto, is an arcuate cam 32 which cooperates with shoes on the ends of the tooth supporting bars for swinging the teeth through a lifting movement, as will presently appear. The traction wheels 11 are generally mounted directly on the axle 12, which is preferably of square or polygonal section, and extends through correspondingly shaped openings in the hub portions 25 of the cylinder heads for revolving the cylinder concurrently with the rotation of the wheels.

Referring to Fig. 6, the tooth supporting bars 23 have reduced ends which are journalled in the rim portions 26 of the cylinder heads and extend beyond these rim portions for supporting curved shoes 34. These shoes cooperate with the cams 32 for imparting to the teeth a quick lifting movement as they swing upwardly around the rear side of the cylinder, as before mentioned. It is customary to have one-half of the series of tooth bars thus actuated from the cam 32 at one end of the cylinder, and the other half of the series from the other cam at the opposite end of the cylinder. To this end, the tooth supporting bars have their ends projecting from the opposite cylinder heads in alternating sequence, whereby the successive tooth bars will have their shoes 34 disposed at opposite ends of the cylinder. Each shoe comprises a long curved arm 34' and a short curved arm 34", the shoe being suitably clamped to the projecting end of the toothed bar, and the long curved arm being reinforced by a brace 35 also clamped to the bar. The weight of the row of teeth 22 mounted on each bar 23 preponderates over the weight of the shoe 34 so that gravity acting on the teeth will give a pivotal swinging motion thereto in the rotation of the cylinder. These teeth are usually sections of spring rod suitably secured to the supporting bars 23.

Projecting laterally from the outer side of each cylinder head are pairs of lugs 37 and 37', these lugs being spaced substantially equi-distantly from the projecting end of each supporting bar carrying a shoe 34, and cooperating with this shoe for limiting the pivotal swing of the gathering teeth 22 relative to the cylinder. The lug 37 is disposed in advance of the projecting end of its associated tooth supporting bar, considered with respect to the normal forward rotation of the cylinder, and the lug 37' is disposed in rear thereof.

In the normal forward rotation of the cylinder, indicated by the arrow in Fig. 2, each row of teeth will swing downwardly into a hay engaging position, indicated approximately by the position a in Fig. 2. At such time, these teeth are projected between successive slats 15, corresponding to their appropriate "opening" in the carrier. The teeth are, of course, so positioned on the tooth supporting bars that they pass into the spaces between adjacent ropes 17 of the carrier; and it will be observed that in this lower position a the teeth are in close proximity to the rear side of the leading slat 15 of its carrier opening. With continued rotation of the cylinder, the long arm 34' of the shoe corresponding to this row of teeth will engage its respective cam 32, thereby giving a sharp upward swinging movement to the teeth, as indicated by the position b in Fig. 2. From this point the teeth are held in operative position by the cam 32, and carry the hay upwardly and place it on the upper flight of the carrier, but when any given tooth supporting bar reaches the uppermost part of the cylinder its shoe 34 is carried beyond the cam 32, permitting the teeth to strip out of the hay and out of the carrier by dropping backwardly into the position indicated approximately at c in Fig. 2. This backward pivotal movement of the teeth is limited by the arm 34' of the associated shoe 34 striking the forward lug 37 on the cylinder head. As the teeth are carried over to the forward side of the cylinder, they pass over the pivotal center of the tooth supporting bar and immediately swing downwardly with a relatively quick drop into the next opening in the carrier. It is desirable to time this downward swing of the teeth so that they will occupy the proper position to swing into an opening between consecutive slats of the carrier. This timed registry is secured by a lug or stop 39 which is secured to the frame 8 in a plane slightly in front of the cylinder. This stop 39 is in position to intercept the short arm 34″ of the shoe when the teeth swing forward and downward, and prevents any considerable downward swinging movement of the teeth until the end of such arm has cleared the stop, thus securing the timed relation necessary to assure proper registration between each row of teeth and a corresponding opening in the carrier. It will be understood that a similar stop 39 is disposed on the other side of the machine for cooperation with the shoe arms 34″ at the opposite end of the cylinder.

In the normal forward travel of the machine, the foregoing cycle will be repeated by each row of teeth, the teeth swinging down into a hay engaging position and then swinging upwardly for lifting the hay to place the same on the carrier, followed by the teeth stripping out of the hay and out of the carrier and thence swinging downwardly again into their proper openings in the carrier. This operation is well known in the art, but the construction heretofore employed is not entirely efficient because in the event of backward movement of the loader there is no assurance that any row of teeth which may be withdrawn from the path of the carrier by such backward movement will again be properly positioned to be projected through an opening or space therein. The stop or stops 39 at the opposite sides of the machine will function to secure proper registry between the teeth and the conveyor in the forward travel of the loader but they are not effective for maintaining or re-establishing this registry in the event of backward travel of the machine. If any row of teeth should fail to re-enter its proper opening upon forward travel being again resumed, the breakage of one of the carrier slats or possibly of the teeth is almost sure to follow.

To avoid this difficulty, I have provided stop means which functions to prevent any row of teeth from leaving its proper opening in the carrier—in such backward movement—after it has once entered such opening. This stop means consists of a stop shoulder 41 disposed below the stop 39, and preferably in the same plane therewith. As shown in Fig. 3, both stops 39 and 41 can be constructed in the form of inwardly projecting ends of a section of channel bar bolted at 42 to the frame 8. The construction shown in Fig. 3, is, of course, duplicated at the opposite side of the machine for cooperating with the shoes at the opposite end of the cylinder.

Referring to Fig. 4, in such backward movement of the loader, any row of teeth which has swung down into the hay engaging position indicated at a in Fig. 2, will be swung back by the cylinder in approximately this same angular position, which will bring the extremity of the long shoe arm 34′ up against the bottom of the stop 41. Upon striking the stop the shoe will be prevented from revolving outwardly or downwardly by reason of its engagement with the lug 37′, and hence the backward rotation of the cylinder will be immediately stopped. Such locked relation of the parts is indicated by the position d in Fig. 4. If such backward rotation begins when one row of teeth has passed into its proper opening in the carrier, but before the long shoe arm 34′ has passed below the stop 41, a locked relation such as is indicated at e in Fig. 5 will occur. In this position the short arm 34″ of the shoe will strike the stop 41 before the teeth have moved back sufficiently far to pass out of the carrier. At this time the long arm 34′ of the shoe, or rather the brace 35, will be engaging the lug 37′ and hence the shoe is prevented from swinging around to clear the arm 34″ of the stop. In either position the cylinder will be positively locked against continued retrograde movement before any row of teeth has had opportunity to move backwardly out of its proper opening in the carrier. This locked relation will remain during any continued backward movement of the loader, resulting in the traction wheels sliding over the ground, until forward motion is again resumed, whereupon the row of teeth will move downwardly in its proper opening in the carrier and each successive row of teeth will enter successive openings therein in accordance with the normal cycle of operation previously described.

For facility of description I have referred to this type of machine as a hay loader, and such is its principal use, but these machines, or equivalent machines of the same general construction are often used for loading beans, peas, etc. Also, this type of machine is primarily intended for windrow loading, but obviously the essence of the invention is not limited thereto.

What I claim as my invention and desire to secure by Letters Patent, is—

1. The combintion with a hay loader comprising a traction driven cylinder and a carrier passing around said cylinder, of a plurality of rows of gathering teeth pivotally mounted on said cylinder and adapted to project through the carrier to pick up the hay and transfer the same to the carrier, and means for preventing withdrawal of the teeth from the carrier by retrograde movement of said cylinder.

2. The combination with a hay loader comprising a traction driven cylinder and a carrier passing around said cylinder, of a plurality of rows of gathering teeth pivotally mounted on said cylinder and adapted to project through openings in the carrier, to pick up the hay and transfer the same to the carrier, and stop means for preventing a row of teeth that has been projected from being withdrawn from the carrier by retrograde movement of said cylinder.

3. The combination with a hay loader comprising a traction driven cylinder and a carrier passing around said cylinder having openings therein, of a plurality of rows of gathering teeth pivotally mounted on said cylinder and caused to swing out through openings in said carrier by forward rotation of the cylinder, and means for preventing withdrawal of the teeth from the carrier by retrograde movement of the cylinder.

4. The combination with a loading machine of the class described comprising a traction driven cylinder and a carrier passing around said cylinder, of a plurality of rows of teeth pivotally mounted on said cylinder and caused to be projected through openings in said carrier by forward rotation of the cylinder, and means for limiting reverse rotation of said cylinder to a degree sufficient to prevent any row of teeth which has been projected into an opening in said carrier from being withdrawn from said opening.

5. The combination with a hay loader comprising a traction driven cylinder and a carrier passing around said cylinder, said carrier having spaced transversely extending slats defining openings in said carrier, of a plurality of rows of teeth pivotally mounted on said cylinder and adapted in the normal forward travel of the machine to be projected through successive openings in said carrier, and means effective upon retrograde movement of said carrier for preventing any row of teeth which has been projected into one of said carrier openings from being withdrawn from such opening.

6. The combination with a hay loader comprising a traction driven cylinder and a carrier passing around said cylinder, of a plurality of rows of teeth pivotally supported on said cylinder and adapted in the normal forward travel of the loader to be projected through successive openings in said carrier, means for timing the pivotal movement of each row of teeth to secure proper registry between said teeth and said openings, and means for preventing said teeth from withdrawing from their proper openings in said carrier on retrograde movement of the loader.

7. The combination with a loader comprising a traction driven cylinder and a slatted carrier passing around said cylinder, of a plurality of tooth supporting bars disposed circumferentially of said cylinder and extending longitudinally thereof, rows of gathering teeth extending from said bars and adapted to be projected through openings in the carrier, shoes mounted on said bars, and means cooperating with said shoes to prevent any row of teeth from moving out of its proper opening in said carrier on retrograde movement of the loader.

8. The combination with a loader comprising a frame, a traction driven cylinder and a slotted carrier passing around said cylinder, of a plurality of tooth supporting bars disposed circumferentially of said cylinder and extending longitudinally thereof, rows of gathering teeth extending from said bars and adapted to be projected through openings in the carrier, shoes mounted on said bars, and means carried by the frame and cooperating with said shoes to prevent any row of teeth from moving out of its proper opening in said carrier on retrograde movement of the loader.

9. The combination with a hay loader comprising a traction driven cylinder and a carrier passing around said cylinder, of a plurality of rows of gathering teeth adapted to be projected through successive openings in said carrier, tooth supporting bars extending longitudinally of said cylinder and on which said teeth are mounted, shoes carried on said tooth supporting bars, cam means arranged to be engaged by said shoes for controlling the operative position of said teeth, and means cooperating with said shoes to prevent any row of teeth which has been projected into an opening in said carrier from being withdrawn from such opening on retrograde movement of said cylinder.

10. The combination with a hay loader comprising a frame, a traction driven cylinder and a carrier passing around said cylinder, of a plurality of rows of gathering teeth adapted to be projected through successive openings in said carrier, tooth supporting bars extending longitudinally of said cylinder and on which said teeth are mounted, shoes carried on said tooth supporting bars, cam means arranged to be engaged by said shoes for controlling the operative position of said teeth, and means carried by the frame and cooperating with said shoes to prevent any row of teeth which has been projected into an opening in said carrier from being withdrawn from such opening on retrograde movement of said cylinder.

11. The combination with a hay loader comprising a traction driven cylinder and a carrier passing around said cylinder, of a plurality of supporting bars pivotally mounted on said cylinder, and spaced circumferentially and extending longitudinally thereof, a row of gathering teeth carried on each of said supporting bars and adapted to be projected through openings in said carrier, shoes mounted on said supporting bars, cam means adapted to be engaged by said shoes for controlling the operative position of said teeth, lugs on said cylinder adapted to be engaged by said shoes, and a relatively stationary stop adapted to be engaged by said shoes in the event of backward travel of the loader for preventing withdrawal of said rows of teeth from their respective openings in the carrier.

12. The combination with a loader comprising a frame, a rotating cylinder, a carrier passing around said cylinder, and gathering teeth pivotally supported on said cylinder for projection in predetermined sequence through successive openings in said carrier, of means carried by said frame for preventing disarrangement of said teeth with respect to said carrier as a result of retrograde movement of the cylinder.

13. The combination with a loading machine of the class described comprising a frame, a rotating cylinder, a carrier passing around said cylinder and a plurality of teeth pivotally mounted on said cylinder for projection through successive openings in said carrier, of means carried by said frame for limiting backward rotation of said cylinder to prevent disarrangement of said teeth with respect to the openings in said carrier.

BARNEY TOMS.